April 13, 1926.  1,580,722

G. GREATHOUSE

SAFETY LOCKING DEVICE FOR AUTOMOBILE DOORS

Filed Oct. 9, 1924

G. Greathouse
Inventor

By Clarence A. O'Brien
Attorney

Patented Apr. 13, 1926.

1,580,722

UNITED STATES PATENT OFFICE.

GILBERT GREATHOUSE, OF GUYAUX, PENNSYLVANIA.

SAFETY LOCKING DEVICE FOR AUTOMOBILE DOORS.

Application filed October 9, 1924. Serial No. 742,609.

*To all whom it may concern:*

Be it known that I, GILBERT GREATHOUSE, a citizen of the United States, residing at Guyaux, in the county of Fayette and State of Pennsylvania, have invented certain new and useful Improvements in Safety Locking Devices for Automobile Doors, of which the following is a specification.

This invention relates to a means for locking the door of an automobile, in such a manner as to prevent the doors from being opened, while the automobile is in motion.

A further object of the invention is to provide a locking device of the above mentioned character, which is adapted to be operated by the emergency brake lever of the automobile, the locking means being adapted to be moved into an operative position, when the emergency brake lever is released, and the automobile is in motion, whereby the doors are held in a closed position, the locking means being adapted to be moved to an inoperative position when the emergency brake lever is applied, and the automobile is at a standstill.

A further object of the invention is to provide a locking device of the above mentioned character, which is so associated with the door and the emergency brake lever of an automobile as not to interfere with the operation of the brake lever or prevent the access to the interior of the automobile, when the doors are opened.

A still further object of the invention is to provide a locking device of the above mentioned character, which is simple in construction, inexpensive, strong and durable, and further well adapted for the purposes for which it is designated.

Other objects and advantages of this invention will become apparent during the course of the following description.

Figure 1:
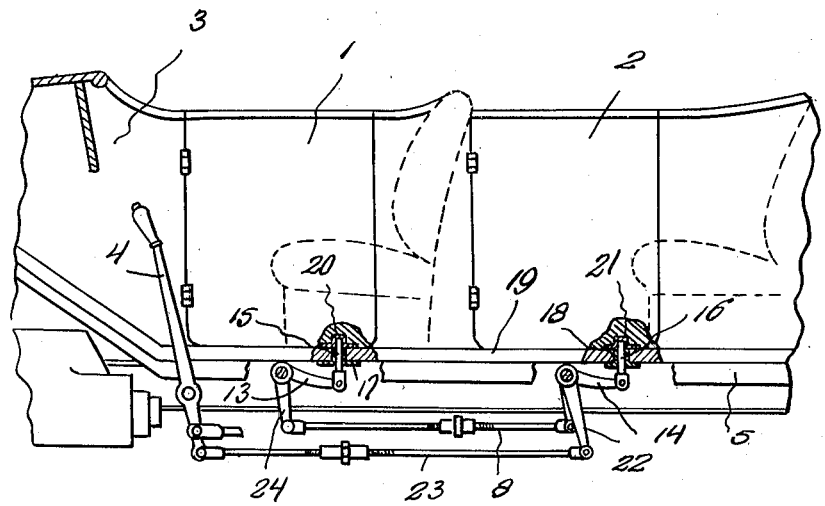
Figure 2:
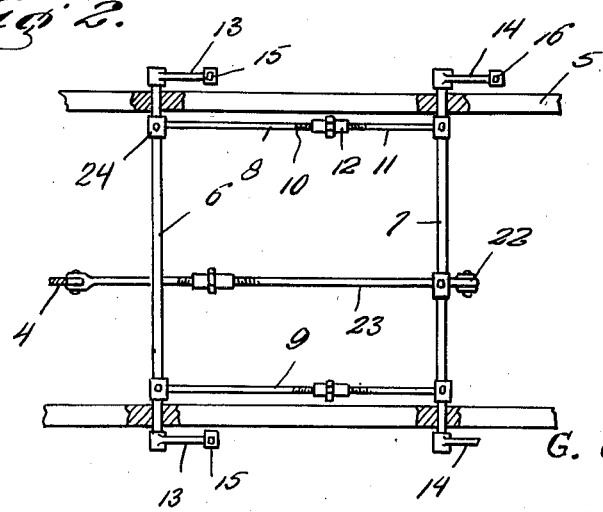

In the accompanying drawing, forming a part of this specification, and in which like numerals designate like parts throughout the same:

Figure 1 is a side elevation of the locking device embodying my invention, showing the same in engagement with the doors on one side of the automobile, and the manner in which the same is associated with the emergency brake lever, and Figure 2 is a top plan view of the locking means.

In the drawing, wherein for the purpose of illustration is shown the preferred embodiment of my invention, the numerals 1 and 2 designate the front and rear doors which are mounted on each side of an automobile body designated generally by the numeral 3. The emergency brake lever of the automobile is indicated at 4, and the chassis at 5. Journaled in the side of the chassis 5, are the transversely extending forward and rear shafts 6 and 7 respectively. The same are adapted to be connected together for simultaneous operation, by means of the adjustable rods 8 and 9 respectively. Each of the rods includes a pair of sections 10 and 11, the outer ends of which are secured to the lower ends of the levers 24, the latter being secured at their upper ends to the shaft 6 and 7 adjacent the inner faces of the sides of the chassis 5, and the adjacent ends of the sections are threaded for receiving the turnbuckles 12. The outer ends of the shafts 6 and 7 extend beyond the sides of the chassis 5, and carry thereon the downwardly extending arms 13 and 14 respectively.

The arms 13 carry on their outer ends the upstanding pins or bolts 15 and similar bolts 16 extend upwardly from the outer ends of the arms 14 carried by the rear shaft 7, at the outer ends thereof. Guide sleeves such as are shown at 17 and 18 respectively are disposed in suitable vertical openings provided therefor in the bottom sill 19 on each side of the automobile body, and the pins or bolts 15 and 16 are adapted to extend upwardly through these guides. The upper ends of the bolts are adapted to be received in suitable sockets 20 and 21, provided in the bottom of each of the front and rear doors 1 and 2, as is clearly illustrated in Figure 1. The sockets form keepers for the upper free ends of the bolts whereby the doors of the automobile will be held in a closed position in the manner hereinafter to be more fully described.

A lever 22 is secured to the intermediate portions of the rear shaft 7, and the same extends downwardly therefrom. The purpose of this lever is to afford a connection between the lower end of the emergency brake lever 4 and the shaft 7 which in turn is secured to the shaft 6, whereby the shafts are adapted for simultaneous actuation. The brake lever 4 is connected to the lower end of the lever 22, by means of the adjustable rod 23, the construction of which is similar to the adjustable rods 8 and 9, the construction of which has heretofore been more fully described. When the emergency brake lever 4 is released and the automobile is in motion, the bolts 15 and 16 will be disposed in engagement with the sockets or keepers 20 and 21 respectively, in the bottom of the front and rear doors, so that the doors will be held in a locked position. This will prevent any possibility of the occupants of the car opening the door while the automobile is in motion. As soon as the automobile is brought to a stop and the emergency brake lever 4 is applied in the usual manner, the bolts 15 ad 16 will simultaneously be moved out of engagement with the sockets or keepers 20 and 21, respectively, so that all of the doors of the automobile will be unlocked and the same will be easily opened. The manner in which the shafts 6 and 7 are simultaneously operated to actuate the bolts through the medium of the operation of the emergency brake lever is obvious from the construction shown, and a further description thereof is not thought necessary.

It will thus be seen from the foregoing description that a simple and efficient means has been provided for locking the doors of an automobile, in such a manner as to prevent the same from being opened while the automobile is in motion, thereby preventing serious accidents which often occur, by the accidental or ordinary opening of the door of the automobile, while the same is in motion. The construction of my improved locking device is such as not to interfere with the ready access to the interior of the automobile, when the doors are open and the locking mechanism is in an inoperative position. Furthermore, the locking mechanism will, at all times, be operated when the emergency brake lever of the automobile is actuated.

While I have shown the preferred embodiment of my invention, it is to be understood that various changes in the size, shape, and arrangement of parts may be resorted to, without departing from the spirit of the invention and the scope of the appended claim.

Having thus described my invention, what is claimed is:

A device for locking automobile doors; wherein the automobile includes hinged doors and an emergency brake lever; comprising a shaft journaled transversely through the sides of the chassis of the automobile, a pair of arms secured to the outer ends of the shafts and extending laterally therefrom, bolts extending upwardly from the outer ends of said arms and operable through the sills at the sides of the automobile body, keepers for the upper ends of the bolts arranged in the bottoms of the doors on the respective sides of the automobile body, and a connection between said shaft and the emergency brake lever whereby the bolts are held in engagement with the keepers when the emergency brake lever is in one position, and out of engagement with the keepers when the brake lever is in another position.

In testimony whereof I affix my signature.

GILBERT GREATHOUSE.